United States Patent
Ogawa et al.

(10) Patent No.: US 7,805,520 B2
(45) Date of Patent: Sep. 28, 2010

(54) STORAGE SYSTEM, PROGRAM AND METHOD

(75) Inventors: Shugo Ogawa, Tokyo (JP); Yoshihiro Hasebe, Tokyo (JP)

(73) Assignee: NEC Corporation, Tokyo (JP)

( * ) Notice: Subject to any disclaimer, the term of this patent is extended or adjusted under 35 U.S.C. 154(b) by 266 days.

(21) Appl. No.: 11/964,319

(22) Filed: Dec. 26, 2007

(65) Prior Publication Data
US 2008/0162754 A1 Jul. 3, 2008

(30) Foreign Application Priority Data
Dec. 27, 2006 (JP) .............................. 2006-352482

(51) Int. Cl.
*G06F 7/00* (2006.01)
*G06F 17/30* (2006.01)

(52) U.S. Cl. .................... 709/227; 709/203; 709/245; 709/228; 709/214

(58) Field of Classification Search .................. 709/227
See application file for complete search history.

(56) References Cited

U.S. PATENT DOCUMENTS

| | | | |
|---|---|---|---|
| 6,976,103 B1* | 12/2005 | Watanabe et al. | 710/74 |
| 7,415,470 B2* | 8/2008 | Kasamsetty et al. | 1/1 |
| 2004/0268175 A1* | 12/2004 | Koch et al. | 714/4 |
| 2005/0038849 A1* | 2/2005 | Kaluskar et al. | 709/203 |
| 2005/0086342 A1* | 4/2005 | Burt et al. | 709/224 |
| 2005/0198384 A1* | 9/2005 | Ansari et al. | 709/245 |
| 2006/0064466 A1* | 3/2006 | Shiga et al. | 709/214 |

FOREIGN PATENT DOCUMENTS

JP 2001249853 A 9/2001

OTHER PUBLICATIONS

Florin Sultan et al., Migratory TCP: Connection Migration for Service Continuity in the Internet, Rutgers, pp. all.*
Ronghua Zhang, Efficient TCP Connection Failover in Web Server Clusters, 2004, University of Virginia, pp. all.*
Alex Snoeren et al., Fine-Grained Failover Using Connection Migration, 2005, MIT, pp. all.*
Alex C. Snoeren et al., "Fine-Grained Failover Using Connection Migration", <URL:http://nms.lcs.mit.edu/papers/migrate-failover.pdf> 3rd USENIX Symposium on Internet Technologies and Systems, San Francisco, CA, Mar. 2001, pp. 1-12.
Masahiko Takahashi and Tomoyoshi Sugawara, "Implementation of Process Migration with TCP Session Continuity suitable for Data Center Environments", Information Processing Society of Japan, SIG Technical Report, OS Study Group, System Platform Research Laboratories, NEC Corporation, 2001-OS-96 (5) Jun. 27, 2004, pp. 29-36.

* cited by examiner

*Primary Examiner*—Ashok B Patel
*Assistant Examiner*—Andrew Goldberg

(57) ABSTRACT

Disclosed is a storage system including a unit that requests reconnection to a host after once disconnecting the connection, and a unit that on receipt of a message for reconnection from the host sends to the host a message indicating that connection migration has been made to another storage and the address information of the destination of migration, wherein with these messages as a sequence of processing operations, control is exercised to send a migrate message after completion of the reconnection request to effect switching of a connection path from a migration source to a migration destination.

10 Claims, 10 Drawing Sheets

STORAGE SYSTEM, PROGRAM AND METHOD

REFERENCE TO RELATED APPLICATION

The present application is claiming the priority of the earlier Japanese patent application No. 2006-352482 filed on Dec. 27, 2006, the entire disclosure thereof being incorporated herein by reference thereto.

FIELD OF THE INVENTION

This invention relates to a storage system and, more particularly, to an apparatus, a program and a method for storage migration.

BACKGROUND OF THE INVENTION

In keeping up with recent IT evolution and with enhancement of the field of application of IT, the amount of data handled by an information processing system is increasing from day to day. These data are held in storages, and the amount of data held per storage is increasing. However, there is a limit to the data capacity that may be stored in each storage. To store data in excess of the capacity in the storage, it is necessary to increase the number of storages.

There are also cases where the limit of the performance of a storage is reached not due to the data capacity in the storage, but due to increase in the number of hosts (devices accessing the storage, such as client or server) attached to the storage. In this case, storage capacity enlargement or load distribution may be achieved through exchange of pre-existing storages (migration source storages) for newly extended storages (migration destination storages), or storage extension combined with distributed data storage.

To enable any one of plural hosts to access any one of plural storages, newly installed on extension, it is necessary to interconnect plural hosts and plural storages over a network. At present, it is customary to use an interconnection configuration in which plural storages of SAN (Storage Area Network) are interconnected over a network, dedicated to storages, to provide for reciprocal accessing to plural storages. To interconnect the storages of SAN, for instance, over a network, to enable shared use, an interface, such as a fiber channel, a network or a protocol, dedicated to storages, is used. Recently, the iSCSI (Internet Small Computer System Interface), implemented on TCP/IP, a general-purpose network protocol, is used as a new protocol for use between the hosts and the storage. The iSCSI layer is located, as a layered model, between the SCSI layer and the TCP/IP layer, receives an SCSI command, data and the response from the SCSI layer, capsules them to formulate an iSCSI PDU (Protocol Data Unit), and sends it via the TCP (Transport Control Protocol) connection of TCP/IP. The iSCSI layer also extracts the SCSI command, data and the response from the iSCSI PDU, received through the TCP connection, to deliver the so extracted command, data and response to the SCSI layer.

In an environment where plural storages are connected to plural hosts over a network, as in the SAN environment, it is necessary to change the storages as the destination for data retention, with a view to expanded storage capacity and to load distribution, thereby achieving more flexible system management. In an environment having many storages, data migration among plural storages (from the migration source storage to the migration destination storage) is implemented mainly by the following two methods:

The first method is to carry out data migration to a migration destination storage as an access to the migration source storage (processing on storage data, such as Read/Write) is inhibited. After completion of the data migration, the destination of connection of the host is switched to the migration destination storage to re-start the access.

The second method is to duplicate data in the migration destination storage, as the access from the host is continued, at the same time that the migration destination storage is updated and the destination storage of host connection is switched from the host with the updated area as a difference. The connection to the migration source storage is switched to the connection to the migration destination storage as the access from the host is inhibited and as the host side connection information is changed to establish a connection path, with the coincidence of duplication on the migration source storage with the duplication on the migration destination storage as a turning point.

As in the method for data migration, described above, it is necessary to switch the destination of connection from the migration source storage to the migration destination storage to carry out data migration among plural storages. The connection to be switched to the migration destination is the connection for a host to access data which has become the object for switching. Hence, the connection of the connection destination that needs to be switched is determined in terms of the data access unit or a data management unit in the storage of migration destination Connection from the host to the storage over a network is via one of plural ports which is a network interface on the storage. To respective ports are allocated addresses of one or more networks.

A storage sets an interface for a host on a storage access protocol, termed a 'target' for one or plural addresses.

In the case of the iSCSI protocol, for instance, one or more IP addresses are allocated to each target. Logical connection and access from the host to the storage are carried out with the target defined on the storage as a unit. Each target corresponds to one or more memory areas in a storage termed as a 'volume'.

Hence, in case of migrating a target on the migration source storage to the migration destination storage, it is necessary to migrate the volume corresponding to the target and the connection for the target.

In the above-described migration methods for storage data, switching of the destination of connection of the host has to be done in both cases as the access from the host is inhibited. That is, if this method for migration is used, it is necessary to halt the access from the host to the storage during the migration operation. Thus, if the access to the host side storage cannot be halted, some other technique needs to be used.

Among the means for switching the host connection destination storages without halting the access from the host, there are the following techniques, for instance.

First, in a SAN environment, if iSCSI is used for connection, the hand-over technique on the pre-existing TCP protocol may be used to provide for connection switching without halting the access from the host.

Transparent switching, as seen from the host of the connection path, may be implemented by the TCP handover technique. With the aforementioned protocol dedicated to storages, the transparent switching, as seen from the host of the connection path, cannot be implemented except if the OS on the host side or the driver is changed.

As an example of the technique for effecting the handover on the TCP protocol, there is a TCP migration technique of switching to different devices from one communication connection unit of the TCP protocol to another, as shown for example in the Non-Patent Document 1.

There has also been proposed a technique in which the storage of connection destination is switched and data is migrated without halting the accessing on the host side. This technique, however, applies only for a storage. In Patent Document 1 (JP patent Kokai Publication No. JP-P2001-249853A), there is disclosed a technique in which a special switch is installed in a network interconnecting the host and the storage to connect the migration source storage and the migration destination storage to the switch. In this technique, connection is transparently switched, from the migration source storage to the migration destination storage, within the inside of the switch, as two targets appear to the host at all times to be a sole target, by the action of the switch.

[Non-Patent Document 1]
Fine-Grained Failover Using Connection Migration Internet <URL: http://nms.lcs.mit.edu/papers/migrate-failover.pdf>

[Non-Patent Document 2]
Masahiko Takahashi and Tomoyoshi Sugawara, "Implementation of TCP non-connection process migration suited for data center environment," Information Processing Society of Japan, OS Study Group, Jun. 17, 2004

[Patent Document 1]
JP Patent Kokai Publication No. JP-P2001-249853A

SUMMARY OF THE DISCLOSURE

The following analysis is given by the present invention. The disclosures of the above-mentioned Non-Patent Documents 1-2 and Patent Document 1 are herein incorporated by reference thereto.

In case the connection by the storage access control, such as iSCSI, is switched using the TCP migration technique of the Non-Patent Document 1, information on a large amount of inner states and the buffer information need to be transferred from the migration source storage to the migration destination storage, in order to migrate the TCP connection.

The iSCSI protocol, for instance, runs on the TCP protocol. It is not possible for the TCP protocol, as a lower layer, to supervise the behavior of an upper protocol, such as iSCSI protocol. Hence, in order for the operation of the upper protocol not to be affected by the migration of the TCP connection, the migration of the TCP connection needs to be transparent to the upper layer.

In TCP, data flow from establishment to the termination of the protocol connection is defined as a single stream. Data dropout, for example, is produced due to the fact that, during migration of the TCP connection, the information contained in the single stream is not migrated in a complete form. Thus, in order for the TCP connection to be migrated transparently with respect to the upper layer, so as not to produce data dropout, the TCP connection needs to be migrated as it maintains the same inner state before and after migration.

In the TCP stream, there is included, in addition to the IP address, indicating an address of a device, the information necessary for controlling the TCP protocol. Such information may be exemplified by the information on the sequence number indicating the sequence of TCP packets or 3-way handshaking, an area transiently buffered during TCP protocol processing, or the contents of the buffer being processed by the OS (operating system). Meanwhile, the 3-way handshaking may be exemplified by SYN transmission from the server to the client, ACK transmission from the server to the client and ACK transmission from the client to the server.

Moreover, to migrate the IP address of the migration source to the migration destination, with the migration of the TCP connection, it is necessary to request rewriting an IP address in the same sub-network by the ARP (Address Resolution Protocol) and a MAC (Media Access Control) address used in the Ethernet (Registered Trademark). The control information to be migrated is varied with the software configuration or the hardware configuration of each machine that sends/receives the TCP stream.

Hence, in case there is coincidence in the software configuration or the hardware configuration of the migration source and the migration destination of the TCP connection, it is possible to inherit the inner state by copying the inner information from the migration source to the destination source.

However, in case there is difference in the software configuration or the hardware configuration between the migration source and the migration destination of the TCP connection, it is necessary to modify the inner information on the migration destination, at the time of the migration, in meeting with the hardware and software environments of the migration destination, and to use the so modified inner information.

Since the combinations of the software configuration and the hardware configuration are diversified, it is difficult to cope with optional configurations of the migration source and the migration destination.

Thus, in case of moving the connection between optional storages, with the use of the technique of TCP migration, as stated e.g. in the Non-Patent Document 1, there is a problem that the hardware configuration and the software configuration for the migration source need to be matched to those of the migration destination.

Accordingly, it is an object of the present invention to provide a system, an apparatus, a method and a computer program, in which, in a system in which a host and a storage are connected over a network, stabilized connection switching may be implemented even in case the hardware/software environment differ optionally between the migration source and the migration destination.

The present invention may be configured substantially as follows. The present invention is applied to a system which is adapted to carry out migration of data stored in a storage accessed by a computer acting as a host to another storage, and switching of the storage connection with the host from a migration source storage to a migration destination storage. The system includes a plurality of such storages connected over a network to the host.

According to the present invention, there is provided a storage system including a reconnection requesting unit in which a storage sends to a host a message requesting the host to disconnect connection once and subsequently requests reconnection, a migration destination notification unit in which said storage sends, on receipt of a reconnection message from the host, a migrate message indicating that the connection has been migrated to another storage, and an address and/or an identifier of a migration destination. The migrate message is sent after completion of the reconnection request. The connection path from a migration source to a migration destination is switched with the above messages as a sequence of processing operations. The storage includes handover control means for sending a migrate message after completion if the request for reconnection.

A storage system according to the present invention includes a host and a plurality of storages attached to the host. One of the storages includes means for requesting reconnection to the host. On receipt of the reconnection request, the one storage turns off the connection with the one storage once and subsequently reconnects to the one storage. The one storage includes means for sending, on reconnection to the host, a message indicating that migration has been made to another storage. On receipt of the message, the host turns off the connection to the storage to connect to the other storage of migration destination.

A storage according to the present invention includes a command processing unit for interpreting a command from a host, and a data memory for holding data and for reading out and updating data in accordance with an instruction output when the command processing unit has interpreted a command for accessing data. The storage also includes a volume information storage unit for recording each volume in the storage and the state of a target associated with the volume, which volume is an area resulting from logical division of data storage area of the storage. The state of the target and the volume includes the information indicating whether or not the target and the volume are in operation for migration. The storage also includes a connection information storage unit for storing the information on the connection and the session emanating from the host to access the storage. The storage also includes a migration request processing unit for receiving a target-based migration request. The migration request processing unit provides a migration destination storage with the information on an address and/or an identifier for a host as a connection source of connection as regards the connection for an object of switching to a migration destination, as reference is made to the information on a target, connection from a host and the session information, as stored in said volume information storage unit and the connection information storage unit. The migration request processing unit instructs starting an operation for migration.

The storage also includes a disconnect request notification unit receiving the instruction by the migration request processing unit and requesting the host connecting to a target, which has become an object for migration, to disconnect the connection once to prompt disconnecting the connection. The storage further includes a migration destination instruction unit receiving the instruction of the migration request processing unit and notifying the host of a migration destination storage, the target is migrated to, in case a connection request is newly made from the host. The migration destination instruction unit requests the host connected to the target being migrated to disconnect the connection, at the same time as the migration destination instruction unit notifies the migration destination storage that the target has been migrated.

A storage according to the present invention becomes a destination of migration destination with respect to another storage as a migration source. The storage includes a command processing unit for interpreting an input command, a data memory for holding, reading out and updating data, and an access arbitration unit for dealing with access requests from the command processing unit and from data copy control unit to the data memory. The storage also includes a data copy control unit instructing a command issuing unit to read from the other storage data of the target being migrated, and also instructing the access arbitration unit to write data read from the other storage, to migrate data stored in the target being migrated, in the other storage, as a migration source, to a relevant target. The storage also includes a copy progress state storage unit for retaining the information on the state of progress of data migration from the other storage, an address of an area in operation for migration in the data copy control unit and an address of an accessing object being processed by the command processing unit, and the command issuing unit receiving an access request to the other storage from the access arbitration unit and the data copy control unit to generate a command from the access request to access the target being migrated in the other storage. The storage also includes a connection information retention unit for storing the information on the connection and the session provided from the host for accessing the storage. The command issuing unit receives from the access arbitration unit an access request to a migration source accompanying the processing of an access request from outside, while receiving from the data copy control unit a data read request accompanying data migration from the migration source to the migration destination.

A system according to the present invention includes a host and a plurality of storages. One of the storages includes means for requesting reconnection to the host. On receipt of the reconnection request, the host turns off the connection with the one storage once and subsequently reconnects to the one storage. The one storage includes means for sending, on reconnection to the host, a message indicating that migration has been made to another storage. On receipt of the message, the host turns off the connection to the storage to connect to the other storage of migration destination.

A storage system according to the present invention includes a host and a plurality of storages. One of the storages includes means for sending to the host a message requesting disconnecting the connection with the one storage and an instruction for connection to another storage of migration destination. The host includes means for disconnecting the connection with the one storage, on receipt of the message from the one storage, to connect to the other storage of migration destination.

A storage system according to the present invention is a storage system in which a host and storage are interconnected via network communication. The storage includes means for issuing a request for re-initiating a session with the host, on the storage access protocol level, in case a request for migration from the storage to another storage is made during a session for accessing between the host and the storage, with a protocol for storage access that is located in an upper layer with respect to a preset protocol taking charge of migration on a network. On receipt of the request, the host re-initiates the session with the storage, and terminates the session with the storage after acquiring the information on the other storage as the migration destination. The host initiates the session with the other storage as the migration destination. Data migration is from the storage as a migration source to the other storage as a migration destination.

A computer program according to the present invention allows a computer of a storage, connected to a host, to execute the processing of requesting reconnection to a host, and the processing of sending, on reconnection to the host, a message indicating that migration has been made to another storage.

A method according to the present invention switches a connection path from one storage connecting to a host to another storage as a migration destination. The method includes a step of the one storage requesting reconnection to the host, and a step of the host once turning off, on receipt of the request for reconnection, the connection to the one storage, and subsequently reconnecting to the one storage. The method also includes a step of the one storage sending, on reconnection to the host, a message indicating that migration has been made to the other storage, and a step of the host disconnecting the connection with the one storage, on receipt of the message, to connect to the other storage.

A method according to the present invention switches storages connected to a host via network communication and includes a step of the storage issuing a request for re-initiating a session with the host on the storage accessing level, in case a request for migration from the storage to another storage is made during a session for accessing between the host and the storage, with a protocol for storage access that is located in an upper layer with respect to a preset protocol taking charge of migration on a network, and a step of the host on receipt of the request re-initiating the session with the storage and terminating the session with the storage after acquiring the information on the other storage as the migration destination. The host initiates the session with the other storage as the migration destination. Data migration is from the storage as a migration source to the other storage as a migration destination.

A method according to the present invention switches storages connected to a host and includes a step of one of the storages sending to the host a message notifying a request for disconnecting the connection with the one storage and an instruction for connection to another one of the storages, and a step of the host disconnecting the connection with the one storage to connect to the other storage of migration destination.

The meritorious effects of the present invention are summarized as follows.

According to the present invention, connection switching may be carried out in stability even if the hardware/software environments of the migration source and those of a migration destination are optional different environments.

Still other features and advantages of the present invention will become readily apparent to those skilled in this art from the following detailed description in conjunction with the accompanying drawings wherein examples of the invention are shown and described, simply by way of illustration of the mode contemplated of carrying out this invention. As will be realized, the invention is capable of other and different examples, and its several details are capable of modifications in various obvious respects, all without departing from the invention. Accordingly, the drawing and description are to be regarded as illustrative in nature, and not as restrictive.

PREFERRED MODES OF THE INVENTION

Figure 1:
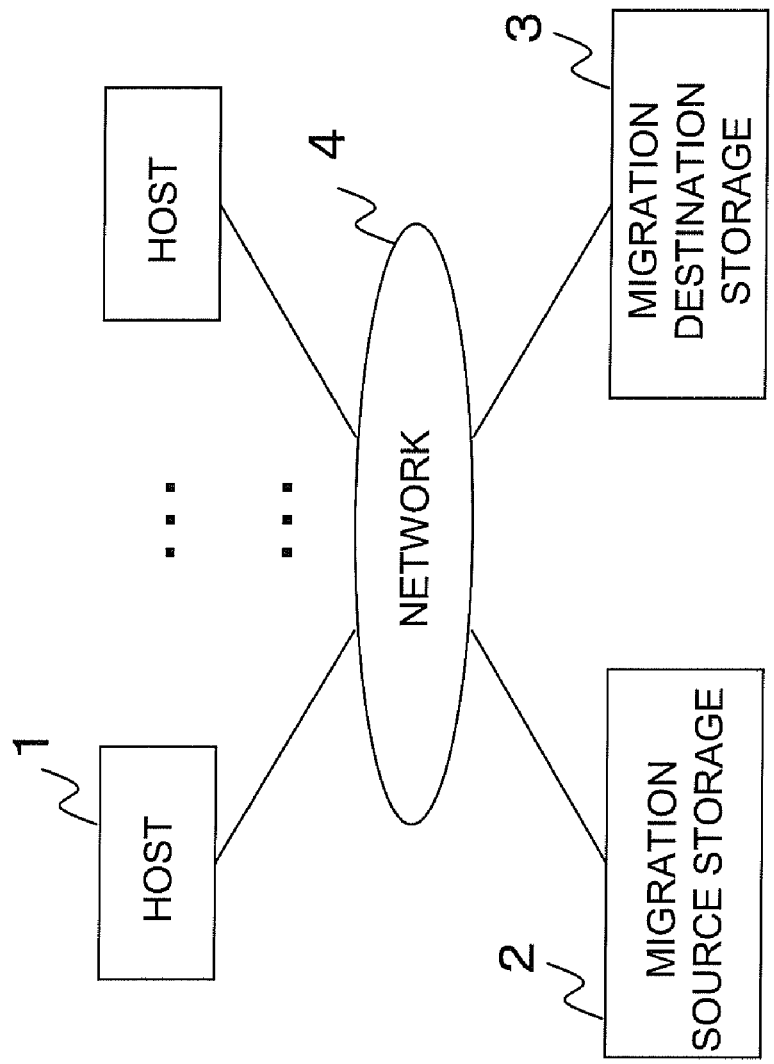
FIG. 1 is a schematic diagram showing a system configuration according to an example of the present invention.

According to the present invention, the processing for connection switching is carried out on a protocol for storage access, which is located in a layer upper than the TCP layer, unlike the processing for data migration on a storage employing the function of TCP migration. The processing for maintaining equal connection states between the migration source and the migration destination, such as transfer of status information, is required in TCP migration function in the switching processing to carry out reconnection to the migration destination. This processing is unneeded in the present invention. Stabilized connection switching may be enabled even under optional different hardware/software environments of the migration source and the migration destination.

The storage according to the present invention includes: a function of sending to a host a message requesting to disconnect connection once and subsequently requesting reconnection (reconnection requesting function); a function of sending, on receipt of the reconnection message from the host, a migrate message indicating that the connection has been migrated to another storage and an address and/or an identifier of a migration destination (migration destination notification unit); and means for sending the migrate message after completion of the reconnection request, with the above messages as a sequence of processing operations, to cause the host to switch the destination of connection of said host, thereby switching a connection path from a migration source to a migration destination.

When the state in which connection cannot be maintained on the storage side has occurred in the host side, the reconnection request function sends to the host a message requesting the host to make connection and reconnection once.

If the connection protocol to a storage is e.g. iSCSI, an asynchronous message (Async event=Target Indicated it will drop the connection), as provided in the iSCSI protocol standard, is used. An Async Event is a connection drop of the target.

The migration destination notification function has the function of returning, at the time of login from the host,
(1) a status showing that the connection presupposed on the host side has migrated to another device; and
(2) an identifier showing the migration destination storage, such as address or name of the migration destination.

This function may be implemented using the iSCSI standard protocol, for instance. An iSCSI session occurs between the initiator and the target through the iSCSI login process. The target storage returns a login response as a response to the login request from the host with the iSCSI protocol. The target storage returns, as its result (status), the target's permanently migrated state (Target migrated Permanently) to the host, while simultaneously returning an IP address and a port address indicating the migration destination of a target the host has attempted to connect to. The host reconnects to a new address. The target means a virtual storage on the iSCSI.

A handover controller controls the following sequence to implement the handover.

On receipt of a handover request, a storage requests reconnection to the host by the reconnection requesting function.

To make reconnection, the host issues a logout request of iSCSI.

On receipt of a logout request (Logout Request) from the host, the storage proceeds to disconnect the iSCSI connection and TCP connection. The host side connection is disconnected simultaneously.

This disconnects the connection between the host and the storage once.

When the host has confirmed that the connection has been disconnected, the host proceeds to 3-way handshaking to establish TCP connection to interconnect the host and the storage.

The host then executes login of iSCSI.

On receipt of the login request for the same target from the host again, the storage's handover controller returns a login response, as a response to the login request, using the aforementioned migration destination notification function, and sends a message indicating that migration has been made to another storage.

On receipt of the login response, the host proceeds to disconnect the iSCSI connection by the logout request and disconnect the TCP connection once, in order to disconnect the current connection and to log in at a new storage.

When it has been confirmed that the iSCSI connection and TCP connection are both disconnected, the host proceeds to make TCP connection and the iSCSI connection at an address of a new migration destination, received by the storage's migration destination notification function. When the connection is confirmed, the state that allows normal accessing (Read/Write operation) is reached to finish the handover.

According to the present invention, it is possible to implement stable handover which, unlike the storage migration employing the TCP migration function, does not depend on the hardware environment or the software environment of the migration source and the migration destination in handover.

More specifically, with TCP migration, the migration of the information indicating the inner state of the TCP connection, such as temporarily stored contents of the buffer or the information indicating the state of the TCP session, such as the sequence number, is required in particular in OS or TCP processing. Further, the MAC address corresponding to the IP address of the destination of connection by ARP needs to be changed from the address of the migration source to that of the migration destination.

Conversely, according to the present invention, it is unnecessary to carry out migrations or changes of the inner information concerning the protocol in a layer lower than the protocol for accessing the storage, such as iSCSI protocol. These migrations or changes may be exemplified by the migration of the information indicating the state of the TCP connection or the session, or changes of the MAC address, corresponding to the IP address of the destination of connection by ARP, from the address of the migration source to that of the migration destination. Thus, according to the present invention, the operation of handing over the information on the inner states of the lower order protocol may be omitted, thereby implementing stabilized handover not dependent on the hardware configuration or the software configuration of the migration source or the migration destination.

According to the present invention, it is only sufficient to send a message requesting reconnection to the host by the reconnection requesting function, a migration message indicating that migration has been made to another storage of the previous connection destination by the migration destination notification function, and the information on the identifiers, such as addresses or names, indicating the destination of migration.

According to the present invention, the message requesting the reconnection to the host, and the migration message indicating the migration of the previous connection destination to another storage, by the migration destination notification function, may be replaced by a message that effects a disconnect request to the host and a connection command to the specified migration destination simultaneously. In this case, the storage sends a message notifying the host of a disconnect request to the storage and connection command to another storage of the migration destination. On receipt of the message from the storage, the host turns off the connection with the storage to connect to another storage which is the migration destination.

According to the present invention, it is possible to implement stabilized migration not dependent on the hardware/software configurations of the migration source or the migration destination.

EXAMPLE

FIG. 1 shows a system configuration according to an example of the present invention. Referring to FIG. 1, the system of the present example includes one or more hosts 1 for accessing data, a migration source storage 2, data is migrated from, a migration destination storage 3, data is migrated to, and a network 4 for interconnecting the host(s) 1 and the storages 2 and 3.

Figure 2:
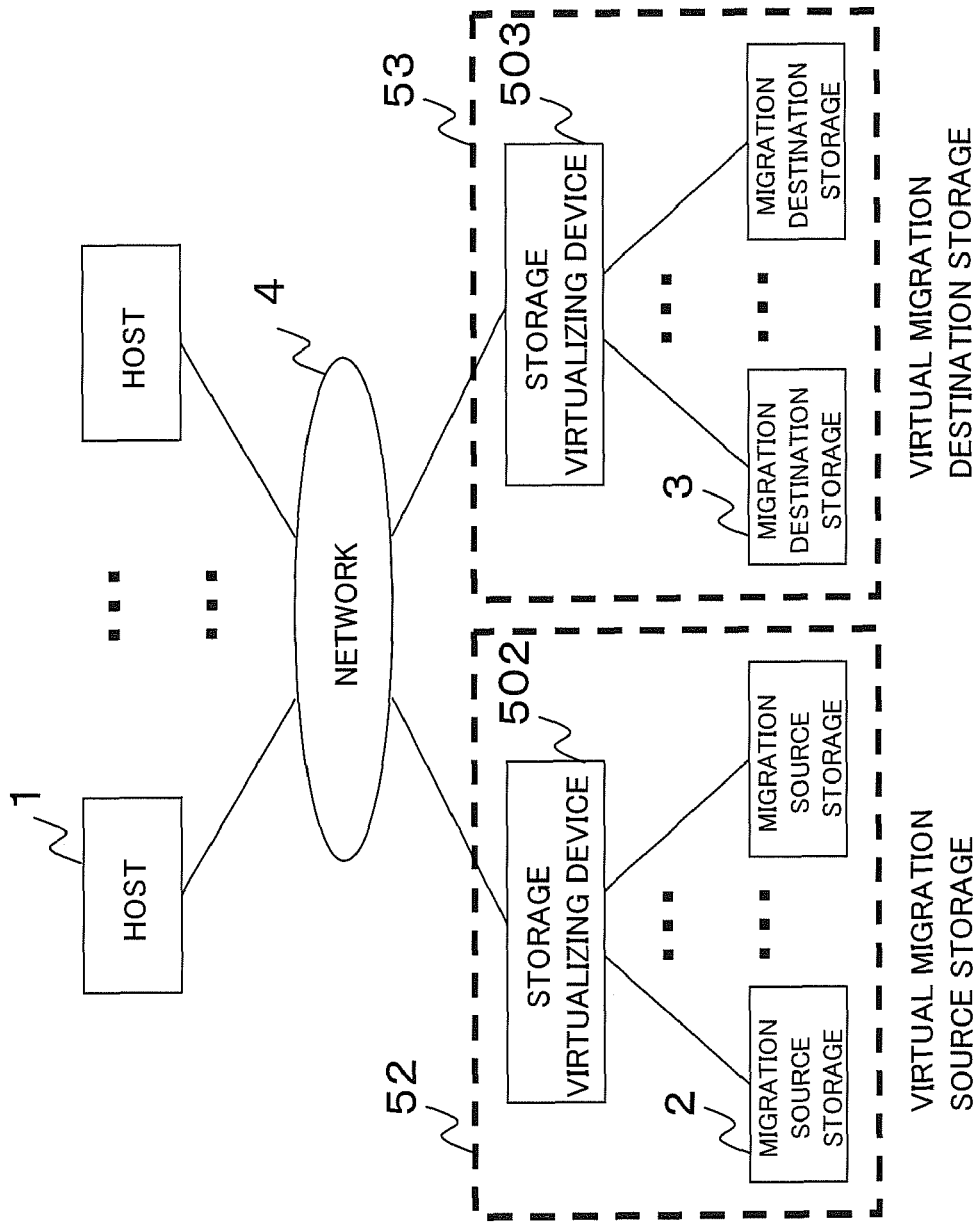
FIG. 2 is a schematic diagram showing a system configuration according to an example of the present invention in which a migration source storage and a migration destination storage are virtual storages formed by virtualization devices.

FIG. 2 shows a system configuration according to another example of the present invention in which each storage is virtualized. Referring to FIG. 2, a storage virtualization device 502 virtualizes plural storages to enable the host 1 to handle these plural storages as a stand-alone virtualized storage. A storage virtualization device 503 also virtualizes plural storages to enable the host 1 to handle plural storages as a stand-alone virtualized storage.

In the present example, the storage virtualization device 502 replaces the migration source storages 2 by a virtual migration source storage 52, while the storage virtualization device 503 replaces the migration destination storages 3 by a virtual migration destination storage 53. Of course, the migration source storages 2 or the migration destination storages 3 may be replaced by the virtual migration source storages 52 or 53, respectively. It is to be understood that if, in the following description, the 'storage' is intended to mean a virtual storage, created by the storage virtualization device, the storage virtualization device 502 and the storage virtualization device 503 are substituted for the migration source storage 2 and the destination source storage 3 of FIG. 2, respectively.

Figure 3:
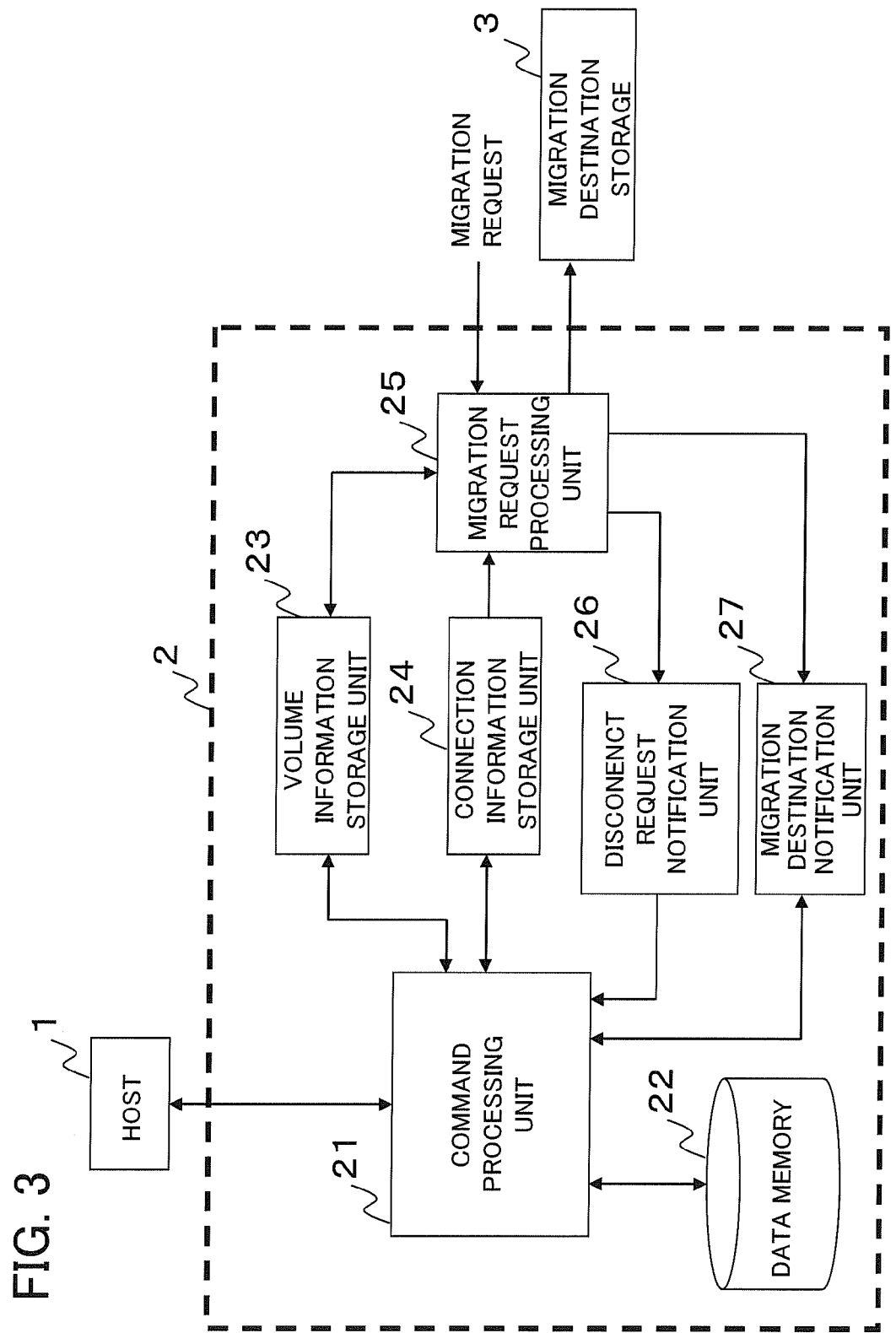
FIG. 3 is a schematic diagram showing the configuration of a migration source storage in an example of the present invention.

FIG. 3 is a diagram showing an illustrative configuration of the migration source storage 2 of FIG. 1. Referring to FIG. 3, the migration source storage 2 includes a command processing unit 21, a data memory 22, a volume information storage unit 23, a connection information storage unit 24, a migration request processing unit 25, a disconnect request notification unit 26 and a migration destination notification unit 27.

The command processing unit 21 interprets a command issued to access data stored in the migration source storage 2. The command is sent from outside the migration source storage 2, such as from the host 1, to the storage 2, over the network 4. The command processing unit 21 accesses the data memory 22 in accordance with the instruction as interpreted. The command processing unit 21 also interprets a connection request from outside, or a management command, in addition to the access request, and carries out processing based on the respective requests.

The data memory 22 holds data stored in the migration source storage 2. The data memory 22 reads out or updates data in accordance with instructions from the command processing unit 21.

The data memory 22 is divided into one or more areas called 'volumes'. A volume or a set of plural volumes is allocated as a unit to one target.

The host 1 connects to and accesses the data, stored in the data memory 22, with the target as a unit.

The volume information storage unit 23 in the migration source storage 2 records the state of each volume in the migration source storage 2, and the relationship of correspondence between the volume and the target. The volume is each area resulting from logical division of the data memory 22 in which to store data. The state of the volume includes the information indicating whether or not the target is in an operation for migration.

The connection information storage unit 24 retains the information on each connection and session from the host 1 to each target included in the migration source storage 2.

The migration request processing unit 25 receives a migration request to the target in the migration source storage 2. The migration request processing unit 25 instructs the disconnect request notification unit 26 and the migration destination notification unit 27 to start the processing for connection switching.

The migration request processing unit 25 also sends back the migration request source a response to the effect that the migration request has been accepted.

The migration request processing unit 25 also acquires the information on the target to be migrated, and on the session, from the volume information storage unit 23 and the connection information storage unit 24.

The migration request processing unit 25 acquires, from the information acquired, an address and/or an identifier of the host 1, as a source of connection as regards the connection for the target being migrated. The migration request processing unit then notifies the migration destination storage 3 of the so acquired information.

The disconnect request notification unit 26 is responsive to instructions from the migration request processing unit 25 to request the hosts 1, connected to the target, which has become the object for migration, to disconnect the connection once, to prompt to effect the disconnection.

When a connection request has newly been made from the host 1, the migration destination notification unit 27 is responsive to an instruction from the migration request processing unit 25 to notify the host 1 of the migration destination storage 3 the target is to be migrated to. Or, the migration destination notification unit 27 requests the target which is as an object for migration, to disconnect the connection with the host, which is being connected to the target, while notifying these hosts that the target has been migrated to the migration destination storage 3.

Figure 4:
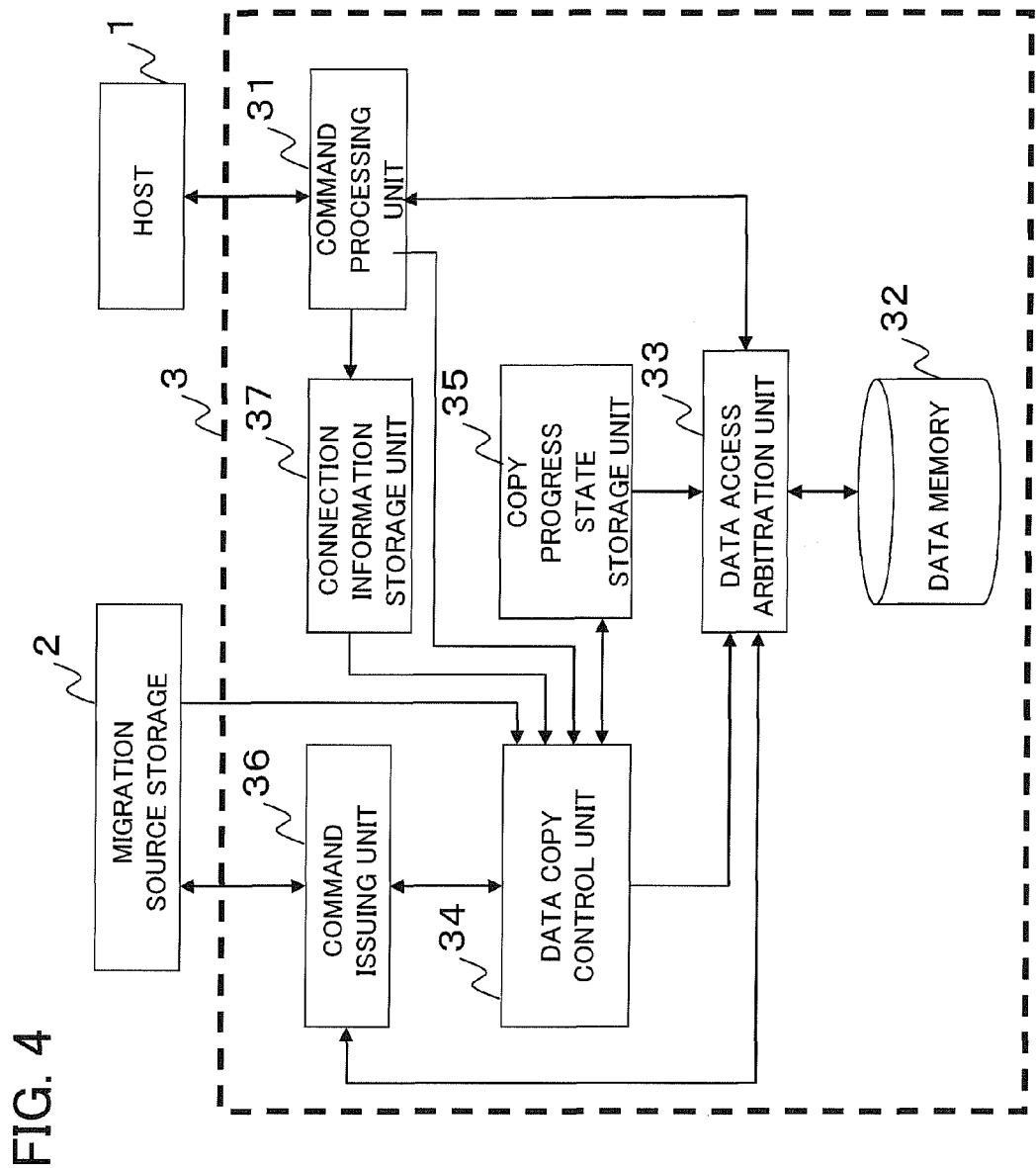
FIG. 4 is a schematic diagram showing the configuration of a migration destination storage in an example of the present invention.

FIG. 4 is a diagram showing an illustrative configuration of the migration destination storage 3 of FIG. 1. Referring to FIG. 4, the migration destination storage 3 includes a command processing unit 31, a data memory 32, a data access arbitration unit 33, a data copy control unit 34, a copy progress-state storage unit 35, a command issuing unit 36 and a connection information storage unit 37.

The command processing unit 31 interprets a command issued from outside, such as from the host 1, to access data stored in the migration destination storage 3.

Based on the results interpreted, the command processing unit 31 instructs the data access arbitration unit 33 to access data stored in the data memory 32. The command processing unit 31 also interprets the connection request or the management command from outside, in addition to the access command, to carry out processing based on the respective requests.

The data memory 32 holds data stored in the migration destination storage 3. The data memory 32 also reads out or updates data under instructions from the data access arbitration unit 33. Like the data memory of the migration source storage 2, the data memory 32 is divided into one or more volume(s).

The data access arbitration unit 33 processes access requests to the data memory 32 from the command processing unit 31 and the data copy control unit 34. When the command processing unit 31 and the data copy control unit 34 appear to the host 1 on the migration destination storage 3 as if they are simultaneously accessing the same area of the data memory, the data access arbitration unit 33 arbitrates the access by exclusive control, for instance. The data access arbitration unit 33 instructs the command issuing unit 36 to access the migration source storage 2, if, judging from the information on the state of copying completion or non-completion for an area as access object by a command from outside, as obtained from the copy progress-state storage unit 35, such accessing is found to be necessary.

The data copy control unit 34 starts the processing of data copying, with receipt of the address information and/or the identifier information of the host 1, as a source of connection as regards the connection of the object for switching from the migration source storage 2 to the destination of migration, as a turning point.

After starting the processing of data copying, the data copy control unit 34 acquires, from the connection information storage unit 37, the previously prepared information on the connection for a target which will become the destination of storage of data for the target being migrated.

The data copy control unit 34 compares the information on the address information and/or the identifier information of a source of connection for the migration destination storage 3, to the corresponding information on the address and/or the identifier of the source of connection as regards each connection of the object of migration, to wait until the connection of the object of switching to the destination of migration has migrated to the migration destination storage 3.

The data copy control unit 34 causes migration of data, stored in a volume in the migration source storage 2, associated with the target as the object for migration, to a corresponding volume in the migration destination storage 3, with the completion of switching of all connections of the object for switching to the migration destination storage 3 as a turning point. To this end, the data copy control unit 34 instructs the command issuing unit 36 to read out data from the target as the object of migration in the migration source storage 2.

The data copy control unit 34 instructs the data access arbitration unit 33 to write data read from the migration source storage 2.

The information on the progress state of data migration is written from the data copy control unit 34 in the copy progress-state storage unit 35.

The copy progress-state storage unit 35 holds
the progress state of data migration from the migration source storage 2,
the address of the area currently in operation for migration in the data copy control unit 34, and
the information on the address of the accessed object currently processed by the command processing unit 31.

The command issuing unit 36 receives access requests to the migration source storage 2 from the data access arbitration unit 33 and the data copy control unit 34.

The command issuing unit 36 generates a command from these requests to access the target, as an object for migration, which is in the migration source storage 2.

The command issuing unit 36 receives, from the data access arbitration unit 33, an access request to a migration source accompanying the processing of an access request from outside. The command issuing unit 36 also receives, from the data copy control unit 34, a data read request accompanying data migration from the migration source to the migration destination.

The connection information storage unit 37 stores the information on each connection and each session, originating from the host 1 and getting to each target in the migration source storage 2.

Figure 5:
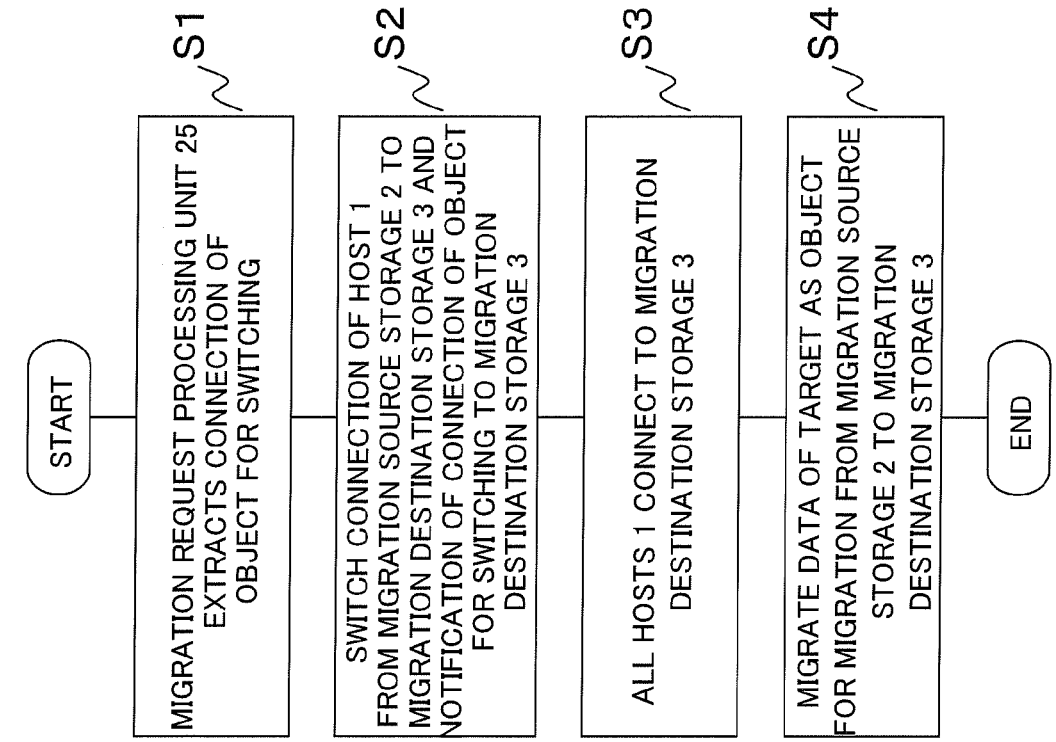
FIG. 5 is a flowchart showing the sequence of operations as from acceptance of a migration request of the migration source storage until processing for data migration.

FIG. 5 depicts a flowchart for illustrating the operation for migration by the system of the present example described with reference to FIGS. 1 to 4.

On receipt of a request for migration for a target in the migration source storage 2, the migration request processing unit 25 of the migration source storage 2 starts the processing for causing migration of the target requested to be migrated.

The migration request processing unit 25 acquires the information on the target, requested to be migrated by the volume information storage unit 23, and on the volume. The migration request processing unit 25 also acquires the information on the address and/or the identifier of the host 1, as a connection source as regards the connection of the switching object from the migration source storage 2 to the migration destination storage 3, which switching object has been connected to the target requested to be migrated by the connection information storage unit 24 (step S1).

The host 1, connected to the target in the migration source storage 2, requested to be migrated, is requested to switch its connection to the migration destination storage 3. The migration destination storage 3 is supplied with the information on the address and/or the identifier of the host 1, as a source of connection as regards the connection for the object for switching, as acquired in the step S1 (step S2).

The host 1, requested to switch the connection from the migration source storage 2 to the migration destination storage 3, disconnects the connection to the migration source storage 2 to connect to the migration destination storage 3 (step S3).

After the connections to the target, as an object for migration, are all switched to the migration destination storage 3, the data copy control unit 34 of the migration destination storage 3 proceeds to migrate data from the migration source storage 2 to the migration destination storage 3 (step S4). The processing from the above step S1 through to the step S4 completes the processing of the entire system.

Figure 6:
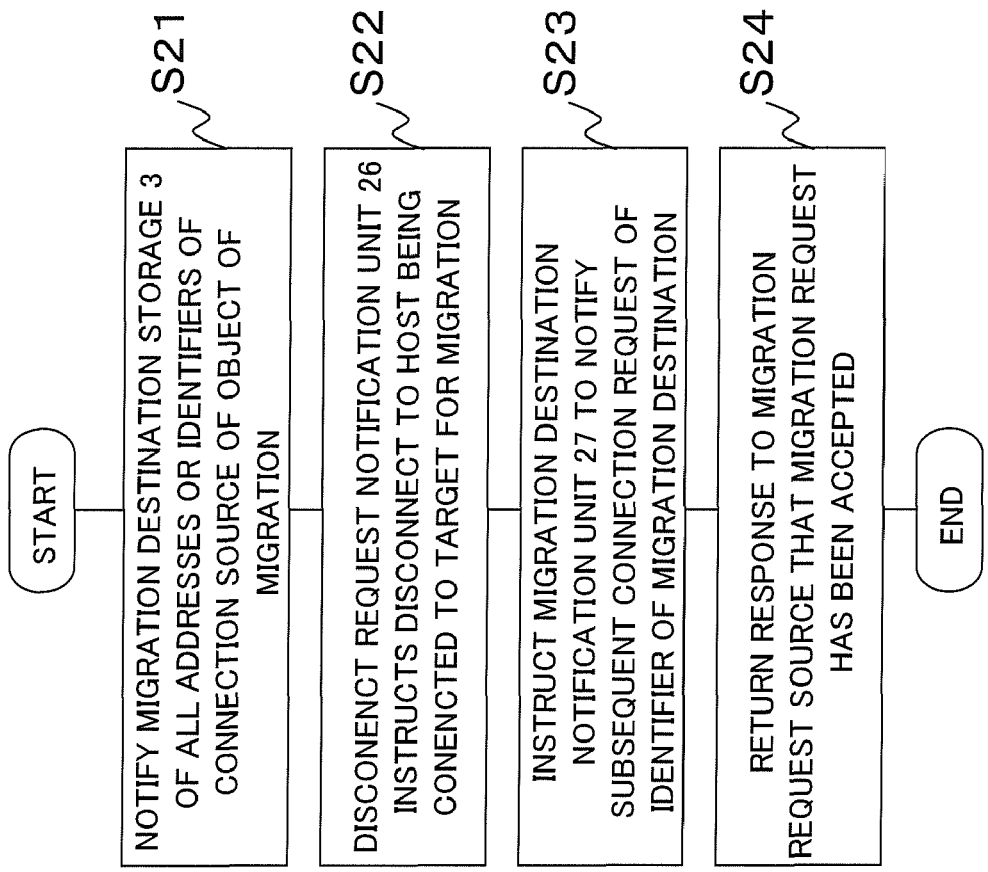
FIG. 6 is a flowchart showing the sequence of operations as from start of connection switching consequent on processing of a request for migration of the migration source storage until notification to the migration destination storage of the host information so far present in a target being migrated.

FIG. 6 shows details of the processing in the step S2 of FIG. 5. The details of the processing in the step S2 are now described with reference to FIGS. 6 and 1 to 4.

On receipt of the request for migration, the migration request processing unit 25 notifies the migration destination storage 3 of the information on the address and/or the identifier for identifying the host 1, as a source of connection to the target requested to be migrated (step S21). This information has been collected at the step S1.

The migration request processing unit 25 instructs the disconnect request notification unit 26 to send a request that all hosts, connecting to the target, as an object for migration, disconnect the connection once, and reconnect to the migration source storage 2. Or, the request sent to the host connecting to the target to be migrated may be such a one to disconnect the connection to switch its connection to the specified migration destination storage 3 (step S22).

The migration request processing unit 25 also instructs the migration destination notification unit 27 that the host 1 connecting to the target as the object for migration reconnects to the migration destination storage 3 (step S23).

The migration request processing unit 25 returns to the party that has requested the migration a response to the effect that the request for migration has been accepted (step S24).

The above steps S21 to S24 do not have to be carried out in the order shown in FIG. 6, that is, the sequence of carrying out these steps may be optionally changed in the course of the processing.

Referring now to the flowchart of FIG. 8, and to FIGS. 1 to 4, the operation for a case where the host 1 disconnected the connection to the migration source storage 2 once to reconnect to the migration source storage 2, and for a case where the host 1 newly attempts to connect to the migration source storage 2, will be described.

In connecting to the migration source storage 2, the host 1 sends to the command processing unit 21 of the migration source storage 2 a request for connection to the target (step S25).

On receipt of the connection request from the host 1, the command processing unit 21 reads out the information on the target, the connection to which has been requested from the volume information storage unit 23, and on the volumes that make up the target, to verify whether or not the target has been made the object of the operation for migration (step S26).

If the target, connection to which has been requested by the host 1, is not the object of the operation of migration (NO branching in a step S27), the command processing unit sends to the host 1 a response to the effect that the processing for connection is allowable. The command processing unit accordingly proceeds to processing for connection.

The command processing unit also causes the information on the connection from the host 1 to be reflected in the connection information storage unit 24.

If the target, requested to be connected to from the host 1, is the object of the operation for migration (YES branch of step S27), the command processing unit sends the command for connection to the migration destination storage 3 to the host 1 to refuse the connection (step S28).

Figure 9:
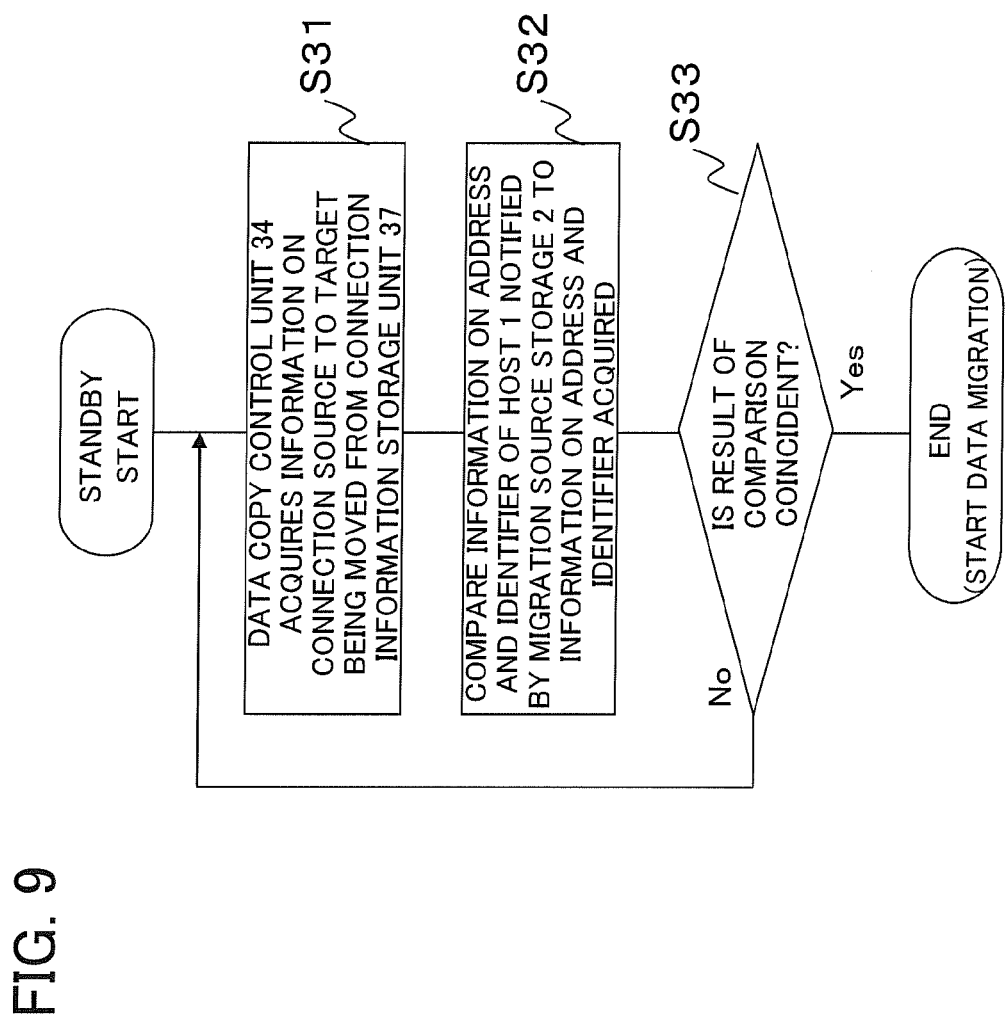
FIG. 9 is a flowchart showing the sequence of standby operations until completion of connection switching in the migration destination storage of all hosts connected to the target being migrated to the migration destination storage, according to an example of the present invention.

FIG. 9 is a flowchart showing details of the processing of the step S3 of FIG. 5. Referring to FIGS. 9 and 1 to 4, the processing of the step S3 is now explained in detail.

The processing in the migration destination storage 3 in the step S3, shown in FIG. 9, is started, on the receipt by the data copy control unit 34 in the migration destination storage 3 of the information on the address and/or the identifier of the host 1, as the source of connection to the target for migration, from the migration request processing unit 25 of the migration source storage 2, as a turning point.

The data copy control unit 34 of the migration destination storage 3 acquires, from the connection information storage unit 37, the information on the address and/or the identifier of the host 1, connecting to the target on the migration destination storage 3, as a storage destination of data of the target to be migrated (step S31).

The data copy control unit 34 compares the information on the address and/or the identifier, acquired in the step S31, to the corresponding information on the address and/or the identifier of the host 1, so far connected to the target for migration, and which has been notified from the migration request processing unit 25 of the migration source storage 2 (step S32).

If, as a result of comparison in the step S32, the information on the address and/or the identifier of the two are completely coincident with each other (YES branch of step S33), the data copy control unit 34 completes the sequence of operations, shown in FIG. 9, to start the processing for data migration from the migration source storage 2 to the migration destination storage 3, as indicated in step S4 of FIG. 5.

If, as a result of comparison in the step S32, the information on the address and/or the identifier of the two are not coincident with each other (NO branch of step S33), the data copy control unit reverts to the step S31 to continue the monitoring of the connection state from the host 1 to the migration destination storage 3. Meanwhile, in case of connection switching from the migration source storage 2 to the migration destination storage 3 for plural hosts 1, so far connected to the target for migration (migration source storage 2) (step S3 of FIG. 5), basically the sequence of processing; operations, shown in FIG. 9, is carried out for each host 1. It is noted that exceptional processing is not directly relevant to the present invention and hence is dispensed with.

Figure 10:
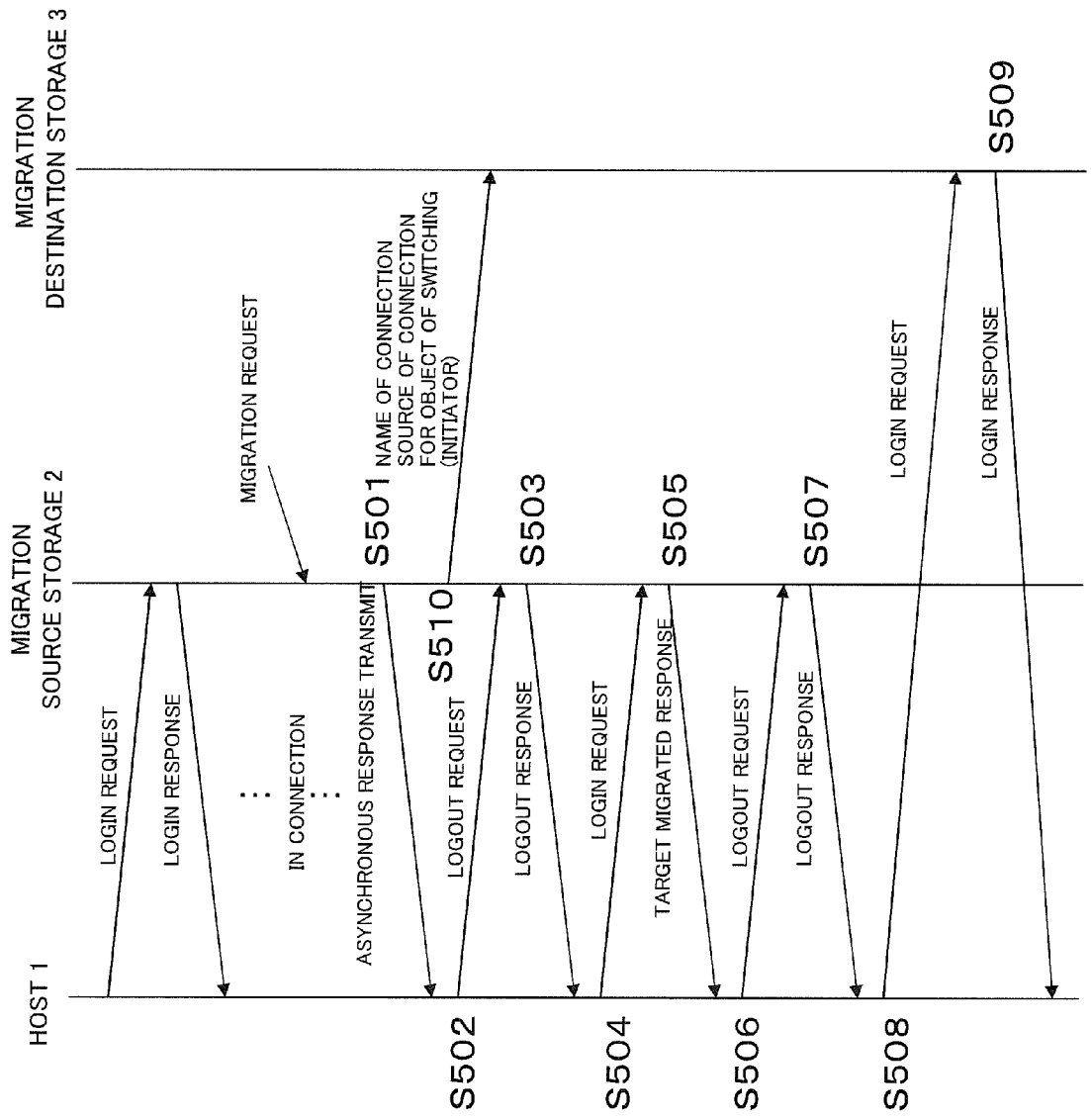
FIG. 10 is a diagram showing the sequence of operations of an example of the present invention.

As a specific example of the operation from step S1 to step S2 of FIG. 5, the operation in case of using the iSCSI protocol for communication between the host 1 and the migration source storage 2 or the migration destination storage 3 is now described with reference to FIGS. 3 to 10. FIG. 10 shows a sequence from acceptance of a request for migration of the migration source storage until instruction for connection to the migration destination storage, in case of communication between the host and the migration source storage or the migration destination storage, with the iSCSI protocol, in accordance with an example of the present invention.

If the host 1 and the migration source storage 2 are connected to each other with the iSCSI protocol, and receive a request for migration, it is determined whether or not the migration is possible. If it is determined that the migration is possible, the migration is started, and an asynchronous message (Asynchronous Message) is sent from the migration source storage 2 to the host 1 connected to a migration destination target (step S501 of FIG. 10 and step S502 of FIG. 6).

The asynchronous message (Asynchronous Message) indicates that the migration source storage 2 requests the host 1 to log out once. On receipt of this request, the host 1 sends the logout request to the migration source storage 2. The logout request may be omitted by directly making a login request of the next step (step S502 of FIG. 10).

When the migration source storage 2 has received the logout request from the host, and finished the logout process, it returns a message of that effect to the host 1 (step S503 of FIG. 10).

Figure 8:
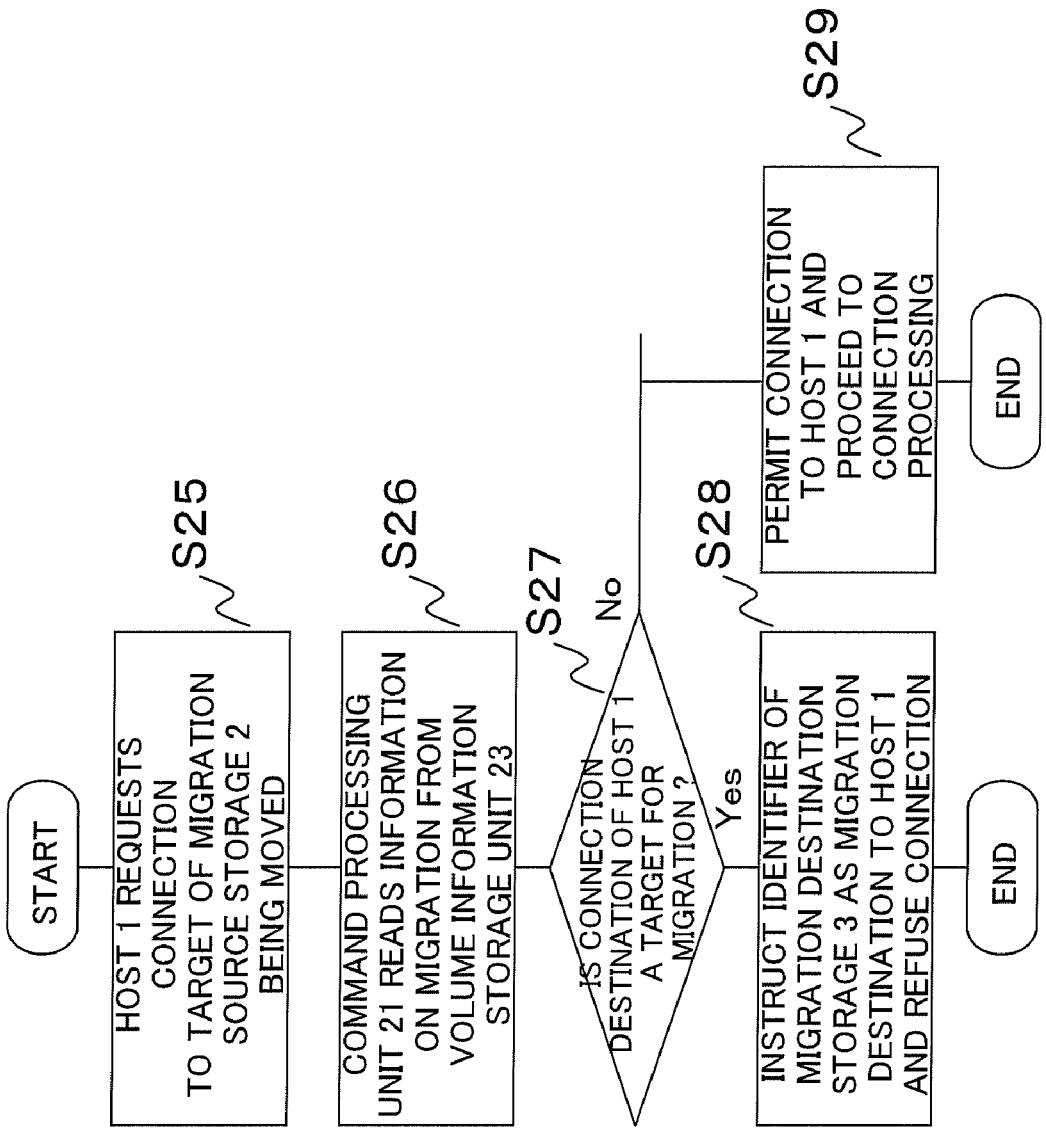
FIG. 8 is a flowchart showing the sequence of operations from the connection of the migration source storage to the host until the instruction for connection to the migration destination storage.

After the host 1 has logged out from the migration source storage 2, the host again sends a login request to the migration source storage 2 to request connection (step S504 of FIG. 10 and step S25 of FIG. 8).

Against the re-login request from the host 1, the migration source storage 2 returns a target migrated (Target Moved) message to advise the host of the fact of storage removal by way of refusing the connection. Simultaneously with refusing the connection, the migration source storage 2 specifies an address on the network 4 of the migration destination storage 3, as the destination for connection to be substituted for the migration source storage (step S505 of FIG. 10, step S23 of FIG. 6 and step S28 of FIG. 8).

On receipt of the target migrate message, the host 1 sends a logout request to the migration source storage 2 (step S506 of FIG. 10).

When the migration source storage 2 has received the logout request from the host and finished the logout process, the migration source storage returns a message of that effect to the host 1 (step S507 of FIG. 10).

The host 1, which has the connection refused by the migration source storage 2, sends a login request to the migration destination storage 3, specified as a migration destination, to request connection (step S508 of FIG. 10).

When the migration destination storage 3 has received the login request from the host and finished the login process, the migration destination storage returns a message of that effect to the host 1 (step S509 of FIG. 10).

After receipt of the request for target migration, the migration request processing unit 25 notifies the migration destination storage 3 of the name of an initiator (Initiator Name), apart from the processing for switching the connection so far established with the target being migrated (step S510 of FIG. 10 and step S21 of FIG. 6). The initiator is an identifier representing the host 1 as a connection source as regards the connection for the target being migrated. The time of notification of this information to the migration destination storage 3 may be any time following the request for migration to the migration source storage 2 in FIG. 10.

By doing the operation of the step S2 as regards the connection from the host 1, connection for the target being migrated from the host 1 in the migration source storage 2 is switched to connection with the migration destination storage 3 (step S3 of FIG. 5).

The migration request processing unit 25 of the migration source storage 2 monitors the information in the connection information storage unit 24. When the connection from the migration source storage 2 to the target being migrated is disconnected, the migration request processing unit 25 instructs the data copy control unit 34 of the migration destination storage 3 to start the operation of moving the data stored in the target as object for migration from the migration source storage 2 to the migration destination storage 3.

Figure 7:
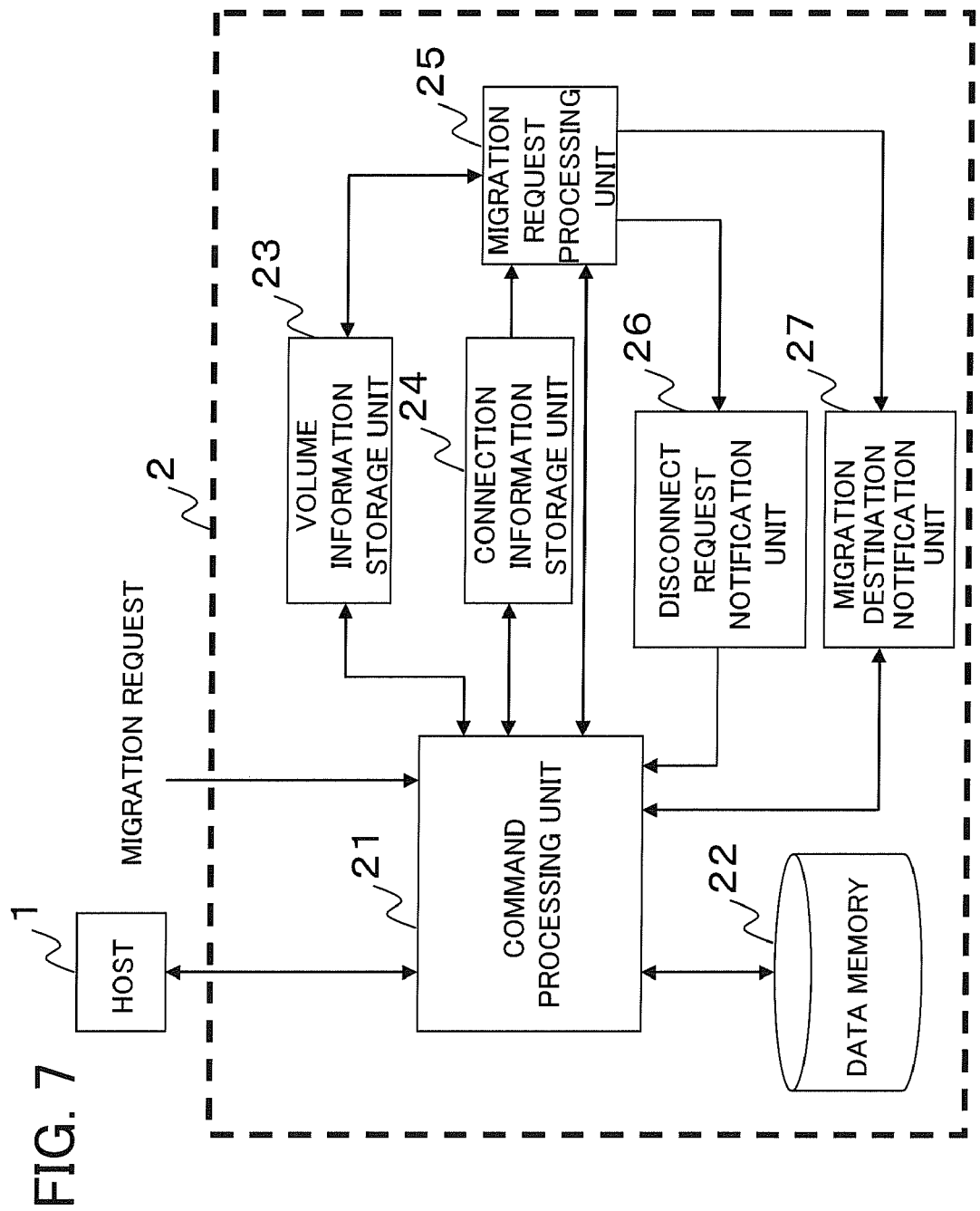
FIG. 7 is a schematic diagram showing an alternative migration source storage according to an example of the present invention.

FIG. 7 shows the configuration of another migration source storage 2 in an example of the present invention. In the configuration of the migration source storage 2, shown in FIG. 3, the migration request processing unit 25 receives a migration request to send an instruction to start the data migration operation. It is however also possible for the command processing unit 21 in the migration source storage 2 to receive the request for migration to instruct the start of the data moving operation via the migration request processing unit 25, as shown in FIG. 7.

In the configuration of the migration destination storage 3, shown in FIG. 4, the instruction for starting the data migration operation is directly received from the migration source storage 2 by the data copy control unit 34. It is however also possible for the command processing unit 31 to receive the instructions for starting the data moving operation, as a command from the migration source storage 2 to the migration destination storage 3, to supply the data copy control unit 34 with the instructions received.

In the foregoing, the example of using the iSCSI protocol has been described. However, the present invention is not limited to this configuration. That is, by way of a modification, the migration source storage 2 of FIG. 1 may send to a host 1 a message notifying the host of a request for disconnecting the connection of the host with the migration source storage 2 and also giving instructions for the host 1 to connect to the migration destination storage 3. On receipt of the message from the migration source storage 2, the host 1 may disconnect the connection with the migration source storage 2 to connect to the migration destination storage 3. The sequence of operations for this modification is now described with reference to FIG. 10. In a step S501, the migration source storage 2 sends to the host 1 a message notifying a request for disconnecting the connection and an instruction for connection to the migration destination storage 3. In a step S502, the host 1 requests the migration source storage 2 to log out. On receipt of the logout response, the host 1 in a step S504 requests the migration destination storage 3 to log in. That is, the processing of steps S504 and S506 by the host 1 and the processing of steps S505 and S507 by the migration source storage 2 are dispensed with.

The present invention may be applied to a disc array device, equipped with plural magnetic disc devices, a set of optical discs or a set of tapes. The present invention may also be applied to a stand-alone magnetic disc, a stand-alone optical disc device or to a stand-alone tape device.

The present invention may also be applied to a switch having the function of virtualizing plural storages so that these storages may appear to be a single storage. That is, the switch is provided between plural hosts and storages so that the plural storages appear to be a sole storage from the hosts via the switch.

Although the present invention has so far been described with reference to preferred examples, the present invention is not to be restricted to the examples. It is to be appreciated that those skilled in the art can change or modify the examples without departing from the scope and spirit of the invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A method comprising, in order:

transmitting a first login request by a host device to a migration source storage device for the host device to login to the migration source storage device;

in response to the migration source storage device receiving the first login request from the host device, transmitting a first login response by the migration source storage device to the host device indicating that the host device has been successfully logged into the migration source storage device to access data stored on the migration source storage device;

after the host device receives the first login response from the migration source storage device, transmitting a request by the host device to the migration source storage device to migrate the data from the migration source storage device to a migration destination storage device;

in response to the migration source storage device receiving the request from the host device for the migration source storage device to migrate data from the migration source storage device to a migration destination storage device, starting the migration of the data from the migration source storage device to the migration destination storage device by the migration source storage device;

sending a response by the migration source storage device to the host device requesting that the host device logout from the migration source storage device;

after the host device receives the response from the migration source storage device requesting that the host device logout from the migration source storage device, transmitting a second login request by the host device to the migration source storage device for the host device to login to the migration source storage device;

in response to the migration source storage device receiving the second login request from the host device, transmitting a second login response by the migration source storage device to the host device indicating that the second login request has been refused and that the data has been migrated from the migration source storage device to the migration destination storage device;

after the host device receives the second login response from the migration source storage device, transmitting a third login request to the migration destination storage device; and, in response to the migration destination storage device receiving the third login request from the host device, transmitting a third login response by the migration destination storage device to the host device indicating that the host device has been successfully logged into the migration destination storage device to access the data migrated from the migration source storage device to the migration destination storage device;

after the host device receives the response from the migration source storage device requesting that the host device logout from the migration source storage device, and before the host device transmits the second login request to the migration source storage device, sending a first logout request by the host device to the migration source storage device for the host device to logout of the migration source storage device;

in response to the migration source storage device receiving the first logout request from the host device, transmitting a first logout response by the migration source storage device to the host device indicating that the host device has been successfully logged out of the migration source storage device;

after the host device receives the second login response from the migration source storage device indicating that the second login request has been refused, and before the host device transmits the third login request to the migration destination storage device, sending a second logout request by the host device to the migration source storage device;

in response to the migration source storage device receiving the second logout request from the host device, transmitting a second logout response by the migration source storage device to the host device.

2. The method of claim 1, wherein starting the migration of the data from the migration source storage device to the migration destination storage device by the migration source storage device is only performed responsive to the migration source storage device first determining that the migration of the data from the migration source storage device to the migration destination storage device is possible.

3. The method of claim 1, wherein the second login response transmitted by the migration source storage device to the host device indicates an address of the migration destination storage device to the host device so that the host device is subsequently able to transmit the third login request to the migration destination storage device.

4. The method of claim 1, wherein the first login request, the first login response, the second login request, and the second login response are transmitted in accordance with an iSCSI protocol.

5. A system comprising:

a migration source storage device to store data; and, a migration destination storage device to which the migration source storage device is to migrate the data from the migration source storage device, wherein in response to the migration source storage device receiving a first login request from a host device, the migration source storage device transmits a first login response to the host device indicating that the host device has been successfully logged into the migration source storage device to access data stored on the migration source storage device;

wherein after the migration source storage device sends the first login response to the host device, and in response to the migration source storage device receiving a request from the host device for the migration source storage device to migrate the data from the migration source storage device, the migration source storage device starts the migration of the data from the migration source storage device to the migration destination storage device;

the migration source storage device sends a response to the host device requesting that the host device logout from the migration source storage device;

wherein after the migration source storage device sends the response to the host device requesting that the host device logout from the migration source storage device, in response to the migration source storage device receiving a second login request from the host device, the migration source storage device transmits a second login response to the host device indicating that the second login request has been refused and that the data has been migrated from the migration source storage device to the migration destination storage device;

in response to the migration destination storage device receiving a third login request from the host device, the migration destination storage device transmits a third login response to the host device indicating that the host device has been successfully logged into the migration destination storage device to access the data migrated from the migration source storage device to the migration destination storage device;

wherein after the migration source storage device sends the response to the host device requesting that the host device logout from the migration source storage device, in response to the migration source storage device receiving a first logout request from the host device, the migration source storage device transmits a first logout response by the migration source storage device to the host device indicating that the host device has been successfully lowed out of the migration source storage device;

wherein after the migration source storage device transmits the second login response to the host device indicating that the second login request has been refused, in response to the migration source storage device receiving a second logout request from the host device, the migration source storage device transmits a second logout response to the host device.

6. The system of claim 5, wherein starting the migration of the data from the migration source storage device to the migration destination storage device by the migration source storage device is only performed responsive to the migration source storage device first determining that the migration of the data from the migration source storage device to the migration destination storage device is possible.

7. The system of claim 5, wherein the second login response transmitted by the migration source storage device to the host device indicates an address of the migration destination storage device to the host device so that the host device is subsequently able to transmit the third login request to the migration destination storage device.

8. The system of claim 5, wherein the first login request, the first login response, the second login request, and the second login response are transmitted in accordance with an iSCSI protocol.

9. The system of claim 5, further comprising the host device.

10. The system of claim 5, further comprising a network by which the migration source storage device and the migration destination storage device are communicatively interconnected.

* * * * *